(12) United States Patent
Alessi et al.

(10) Patent No.: US 8,468,229 B2
(45) Date of Patent: Jun. 18, 2013

(54) METHOD AND SYSTEM FOR CONTROLLING CONTENT DISTRIBUTION, RELATED NETWORK AND COMPUTER PROGRAM PRODUCT THEREFOR

(75) Inventors: Marzio Alessi, Turin (IT); Eugenio Maria Maffione, Turin (IT)

(73) Assignee: Telecom Italia S.p.A., Milan (IT)

( * ) Notice: Subject to any disclaimer, the term of this patent is extended or adjusted under 35 U.S.C. 154(b) by 883 days.

(21) Appl. No.: 10/594,310

(22) PCT Filed: Mar. 31, 2004

(86) PCT No.: PCT/EP2004/003409
§ 371 (c)(1),
(2), (4) Date: Sep. 27, 2006

(87) PCT Pub. No.: WO2005/096586
PCT Pub. Date: Oct. 13, 2005

(65) Prior Publication Data
US 2007/0162434 A1   Jul. 12, 2007

(51) Int. Cl.
*G06F 15/173* (2006.01)
*G06F 17/30* (2006.01)

(52) U.S. Cl.
USPC .......... 709/223; 709/201; 709/219; 707/706; 707/966; 707/999.01; 707/999.001

(58) Field of Classification Search
USPC ......... 709/213, 201, 203, 217–219, 231–232; 707/706, 966, 999.01
See application file for complete search history.

(56) References Cited

U.S. PATENT DOCUMENTS

| 6,405,219 | B2 * | 6/2002 | Saether et al. ........................ 1/1 |
| 6,829,613 | B1 * | 12/2004 | Liddy .................................. 1/1 |
| 6,928,485 | B1 * | 8/2005 | Krishnamurthy et al. .... 709/242 |
| 7,133,905 | B2 * | 11/2006 | Dilley et al. ................... 709/219 |
| 7,143,170 | B2 * | 11/2006 | Swildens et al. .............. 709/226 |

(Continued)

FOREIGN PATENT DOCUMENTS

| WO | WO-00/42519 | 7/2000 |
| WO | WO-01/82023 A2 | 11/2001 |
| WO | WO-02/071191 A2 | 9/2002 |

OTHER PUBLICATIONS

Dar et al.; "Semantic Data Caching and Replacement"; Proceedings of the International Conference on Very Large Data Bases, pp. 1-12, (1996).

(Continued)

Primary Examiner — Ashokkumar B. Patel
Assistant Examiner — Linglan Edwards
(74) Attorney, Agent, or Firm — Finnegan, Henderson, Farabow, Garrett & Dunner, L.L.P.

(57) ABSTRACT

A method for controlling distribution of media contents over a network is provided, wherein the contents are distributed contents available at surrogate servers and remaining contents that are not available at the surrogate servers. The method includes identifying contents eligible for distribution from the remaining contents; defining a set of categories; identifying for each category at least a reference content; associating the identified contents with the predefined categories based on semantics affinity with the reference content, the semantics affinity being calculated as the distance of each of the identified contents to the at least a reference content; selecting at least one of the predefined categories; and making at least one of the identified contents associated with the selected predefined category available for distribution at the surrogate servers.

8 Claims, 9 Drawing Sheets

U.S. PATENT DOCUMENTS

| | | | | |
|---|---|---|---|---|
| 7,222,185 | B1* | 5/2007 | Day | 709/232 |
| 7,283,992 | B2* | 10/2007 | Liu et al. | 1/1 |
| 7,493,312 | B2* | 2/2009 | Liu et al. | 1/1 |
| 7,689,629 | B1* | 3/2010 | Baatz et al. | 707/794 |
| 2001/0042110 | A1* | 11/2001 | Furusawa et al. | 709/219 |
| 2002/0010798 | A1* | 1/2002 | Ben-Shaul et al. | 709/247 |
| 2002/0062300 | A1* | 5/2002 | Asadov et al. | 707/1 |
| 2002/0073165 | A1* | 6/2002 | McNulty et al. | 709/217 |
| 2002/0087659 | A1* | 7/2002 | Chapman et al. | 709/218 |
| 2002/0152318 | A1* | 10/2002 | Menon et al. | 709/231 |
| 2002/0188681 | A1* | 12/2002 | Gruen et al. | 709/204 |
| 2003/0028564 | A1* | 2/2003 | Sanfilippo | 707/513 |
| 2003/0115421 | A1* | 6/2003 | McHenry et al. | 711/133 |
| 2003/0236659 | A1* | 12/2003 | Castellanos | 704/4 |
| 2004/0088157 | A1* | 5/2004 | Lach et al. | 704/9 |

OTHER PUBLICATIONS

Katsaros et al.; "Cache Management for Web-Powered Databases"; retrieved from http://delab.csd.auth.gr/papers/IDEA02km.pdf>, pp. 201-242, (2003).

\* cited by examiner

METHOD AND SYSTEM FOR CONTROLLING CONTENT DISTRIBUTION, RELATED NETWORK AND COMPUTER PROGRAM PRODUCT THEREFOR

CROSS REFERENCE TO RELATED APPLICATION

This application is a national phase application based on PCT/EP2004/003409, filed Mar. 31, 2004, the content of which is incorporated herein by reference.

FIELD OF THE INVENTION

The present invention generally relates to techniques providing real-time automatized content distribution, and particularly to a system for distributing contents over a Content Delivery Network (CDN) within a Service Provider (SP) environment.

DESCRIPTION OF THE RELATED ART

In Content Delivery Networks, all the authorized requests for a specific Internet content from a particular geographic area (or PoP) are re-directed toward surrogate servers or cache servers able to provide the required content under the best conditions.

The purposes of these surrogate servers or cache servers are:
 verifying that the content requested is available (i.e. stored in the cache), updated ("fresh") and suitable to be provided to any requesting user; and
 if the content requested is not available, to request it from an original server and to store (cache) it for a following incoming request.

A Service Provider equipped or using a Content Delivery Network is required to provide a content networking service to its customers. Depending on the business model involved, these customers can be Content Providers, end users or both. The end users are the final users that request content from their players or browsers.

Resorting to a Content Delivery Network becomes an inescapable need when the contents requested from the end users become very "significant" in terms of size and/or bit-rate. This is particularly true for real-time streaming services (both live or on-demand).

In WO-A-00/42519, a system and a method are described for accelerating distribution of content of a global communication network as the Internet. A central proxy server transmits extracted data files over a communication medium to provide content filling of local proxy servers. The local proxy servers concurrently receive the data files from the communication medium at a high rate of speed and store the data files in attendant local cache databases. The local proxy servers utilize a localized heuristics scheme to determine whether to keep or discard the data. When a user requests Internet data, the user's request is first received by the local proxy server. If the requested data is present among the cached data files, it is rapidly transmitted directly to the user from the local proxy server; if not present, a request is transmitted to the central proxy server.

A technique as described in WO-A-01/82023 for centralized and differentiated content and application delivery allows content providers to directly control the delivery of content based on regional and temporal preferences, client identity and content priority. A scalable system is provided in an extensible framework for edge services, employing a combination of a flexible profile definition language and an open edge server architecture in order to add new and unforeseen services on demand. In one or more edge servers content providers are allocated dedicated resources, which are not affected by the demand or the delivery characteristics of other content providers. Each content provider can differentiate different local delivery resources within its global allocation. Since the per-site resources are guaranteed, intra-site differentiation can be guaranteed. Administrative resources are provided to dynamically adjust service policies of the edge servers.

Additionally, WO-A-02/071191 describes a distribution arrangement driven by a so-called metadata enabled push-pull model for efficient low-latency video-content distribution over a network. Metadata is used as a vehicle and mechanism to enable intelligent decisions to be made on content distribution system operation. Metadata is data that contains information about the actual content, and in some cases, the metadata may also contain portions of the content or a low-resolution preview of the content. Aspects of this prior art arrangement are directed toward the distribution of metadata throughout the network in a way that facilitates efficient system operation as well as optionally providing sets of services such as tracking, reporting, personalization and the like.

OBJECT AND SUMMARY OF THE INVENTION

The object of the invention is to provide arrangements wherein the time involved in responding to users' request for the contents offered by Service Providers/Content Providers is further reduced by making these Service Providers/Content Providers able to make new contents available at optimised geographic locations by forecasting the development of requests.

Additionally, the invention aims at permitting contents that are lapsed to be "refreshed", by further expanding the objects available at a given cache based on self-adaptive criteria related to the trends of users' interests by relying on the semantic affinity of the content itself.

The present invention aims at achieving the goals set out in the foregoing without having to resort to a very complex architecture, while also developing an inferential/adaptive mechanism for automatically modifying the distribution policies.

According to an aspect of the present invention, such an object is achieved by means of a method for controlling distribution of media contents over a network, wherein said contents are distributed by making said contents available at surrogate servers, the method including the steps of:
 identifying additional contents eligible for distribution;
 defining a set of categories;
 identifying for each category at least a reference content;
 associating said additional contents to said predefined categories based on semantics affinity with said reference content, said semantics affinity being calculated as the distance of each of said additional contents to said at least a reference content;
 selecting at least one of said predefined categories; and
 making at least one of the additional contents associated to said selected predefined category available for distribution at said surrogate servers.

According to another aspect of the present invention such an object is achieved by means of a further method for controlling distribution of media contents over a network, including a set of surrogate servers for distributing said contents, by making said contents available at said surrogate servers, said method including the steps of:

receiving input information comprising at least usage information provided by said surrogate servers, category information provided by a first database storing a classification in predefined categories of said distributed contents, and a predefined interest threshold, said predefined interest threshold being representative at least of a frequency of the request for a given content belonging to a given category;

matching with each other said input information so as to generate a class template comprising said input information, when said predefined interest threshold is exceeded;

adding to said class template content information provided by a second database storing a classification in said predefined categories of additional contents, said content information including at least information on an additional content included in said given category; and generating control signals from said modified class template, said control signals being able to control a distribution system in order to make available said at least an additional content at said surrogate servers.

According to a further aspect of the present invention such an object is achieved by means of a system for controlling distribution of media contents over a network, including a set of surrogate servers for distributing said contents, by making said contents available at said surrogate servers, said system including at least:

a class matcher module configured for:
receiving as input information at least usage information provided by said surrogate servers, category information provided by a first database storing a classification in predefined categories of said distributed contents, and a predefined interest threshold, said predefined interest threshold being representative at least of a frequency of the request for a given content belonging to a given category;

matching with each other said input information so as to generate a class template comprising said input information, when said predefined interest threshold is exceeded;

a class/policy template repository having a first input for receiving said class template and a second input enabling said operator to add to said class template content information provided by a second database, storing a classification in said predefined categories of additional contents, said content information including at least information on an additional content included in said given category; and a command generator to generate control signals from said modified class template, said control signals being able to control a distribution system in order to make available said at least an additional content at said surrogate servers.

According to further aspects of the present invention such an object is achieved by means of a network including such a system, and a computer program product loadable into the memory of at least one computer and including software code portions for performing the steps of the method of the invention. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed fashion.

Further preferred aspects of the present invention are described in the dependent claims and in the following description.

Essentially, the arrangement described herein provides real-time automated content distribution based on a "semantics" extension of contents already distributed. Specifically the arrangement described herein is based on the principle of classifying, e.g. by resorting to data mining/artificial intelligence mechanisms, users' requests (and possibly also the actual delivery and usage of such contents) by aggregating such information with other information such as real-time information concerning each and every content distributed (for instance, the share for a content in a given geographic area, the trend of requests during a given time period, data on users requesting a given content, statistics concerning those contents most frequently requested, specific information concerning the most requested content from a given proxy-cache). The results are exploited by a Service Providers/Content Providers to increase the contents available in those areas and in those periods of time where they are actually required.

BRIEF DESCRIPTION OF THE ANNEXED DRAWINGS

The invention will now be described, by way of example only, by referring to the enclosed figures of drawing, wherein.

DETAILED DESCRIPTION OF AN EXEMPLARY EMBODIMENT OF THE INVENTION

Figure 1:
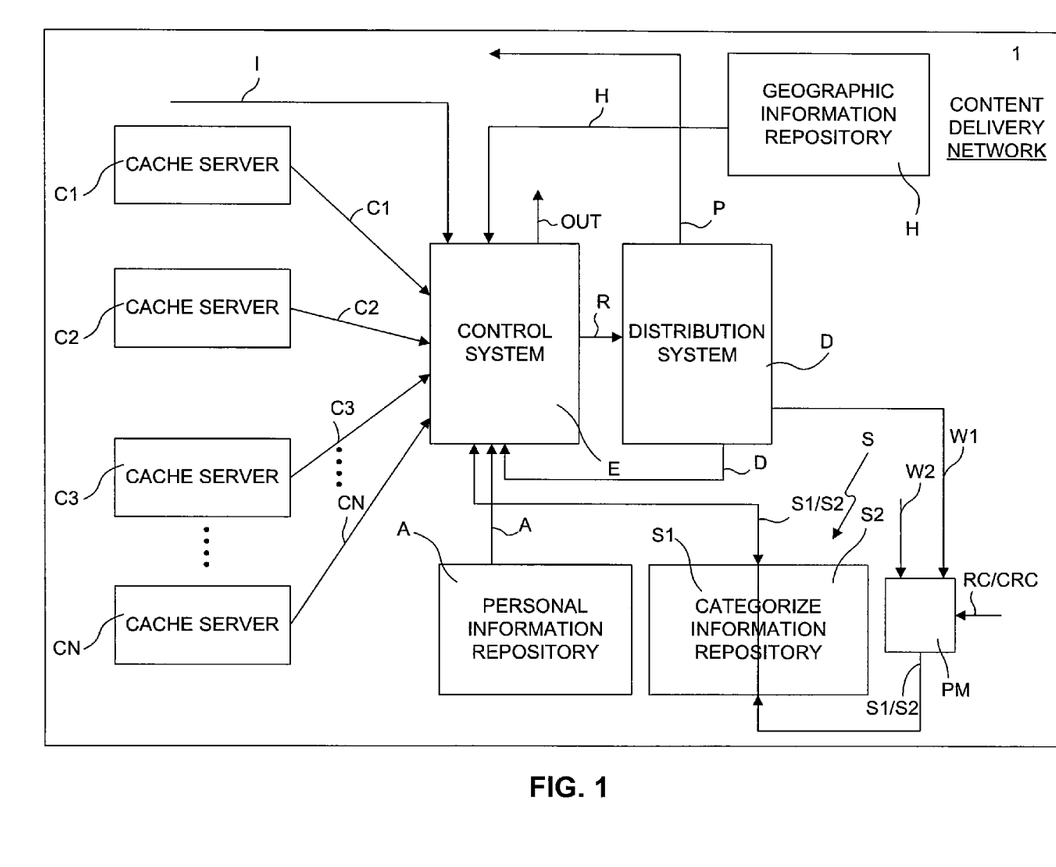
FIG. 1 is a block diagram of a system implementing the present invention.
Figure 2:
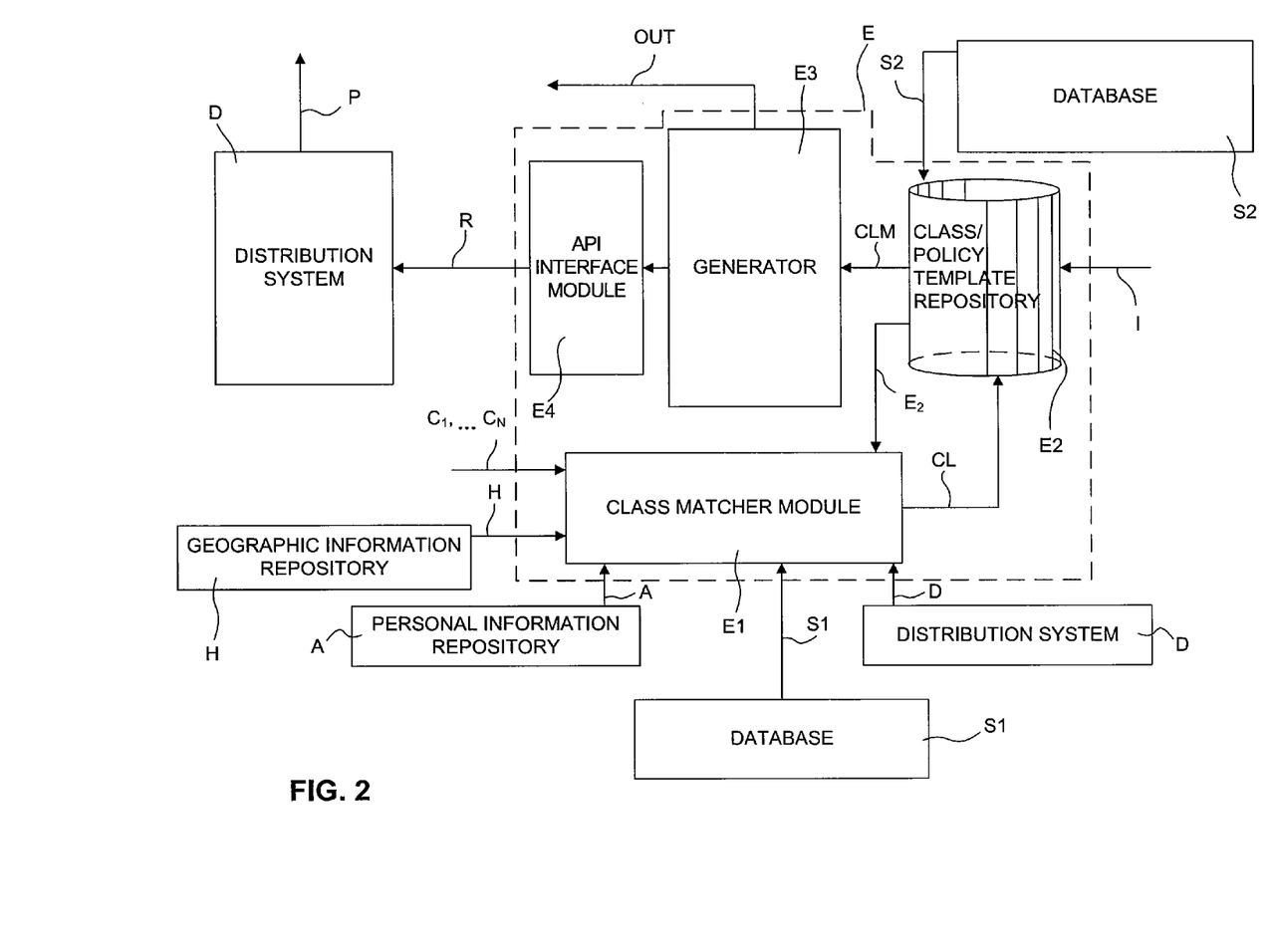
FIG. 2 is another block diagram detailing the structure of one of the blocks shown in FIG. 1.

FIGS. 1 and 2 show a Content Delivery Network (CDN) 1, operating over an IP network and comprising a control system E for controlling the distribution of contents over the CDN 1.

The control system E is able to collect, filter and aggregate input information a, $c_1, \ldots, c_n$, d, h, $s_i$, $s_2$, I respectively provided by a plurality of data sources A, $C_1, \ldots, C_n$, D, H, S included in the CDN 1 and to produce output signals Out, r.

More specifically, data source A is a repository storing personal information, designated with a, regarding the CDN users. Typically, the repository A includes a relational database cooperating with an AAA (Authentication, Authorization and Accounting) server (such as RADIUS server, for instance).

Data sources $C_1, \ldots, C_n$ are cache servers distributed over the whole CDN 1. Each cache server $C_1, \ldots, C_n$ provides usage information, designated with $c_1, \ldots, c_n$, concerning each and every content distributed. This usage information are related to, e.g.:

the share for a content in a given geographic area (the PoP area);

the trend of requests during a given time period;

data on users requesting a given content;

statistics concerning those contents most frequently requested;

specific information concerning the most requested content from a given cache server; and meta-data for any specific requested contents.

Data source D is a commercial or generally known distribution system providing the control system E with the input information, designated with d. Typically, input information d include information regarding the CDN topology and the provisioning policies established by the Service Provider or the Content Providers.

Data source H is another repository including geographic information, designated with h, related to the geographic locations where users access the CDN 1. For instance, when access to the CDN 1 is (also) from a mobile (GSM/GPRS/EDGE/UMTS) or wireless network, geographic information h comprise geometric information related to the area of the local register (VLR) where the users are at the moment logged in.

Input information, designated with I, are related to interactions with the Service Provider/Content Provider (designated with the term "operator" in the following). These interactions comprise the provision of policy templates CPT defined by the operator and described in more detail in the following.

Data source S is a further repository including a first and a second database, designated $S_1$ and $S_2$ respectively. Repository S provides category information, designated with $s_1$, $s_2$, related to a classification in categories, so-called meta-families mf, of the contents managed by the CDN 1. Each meta-family mf comprises contents having a certain degree of semantic affinity, as will be described in more detail in the following. These meta-families are established by the operator or by the Content Provider and can be of a wider type (wide cardinality), for instance: sport, health education or narrower (low cardinality) for instance: soccer, basketball, and so on.

Specifically, database $S_1$ contains a classification in meta-families of the contents already managed by the distribution system D.

Conversely, database $S_2$ contains classification in meta-families for other contents that are potentially suitable to be distributed.

The operator generally knows what contents have been already distributed by the distribution system D and what contents are suitable to be potentially distributed.

Figure 3:
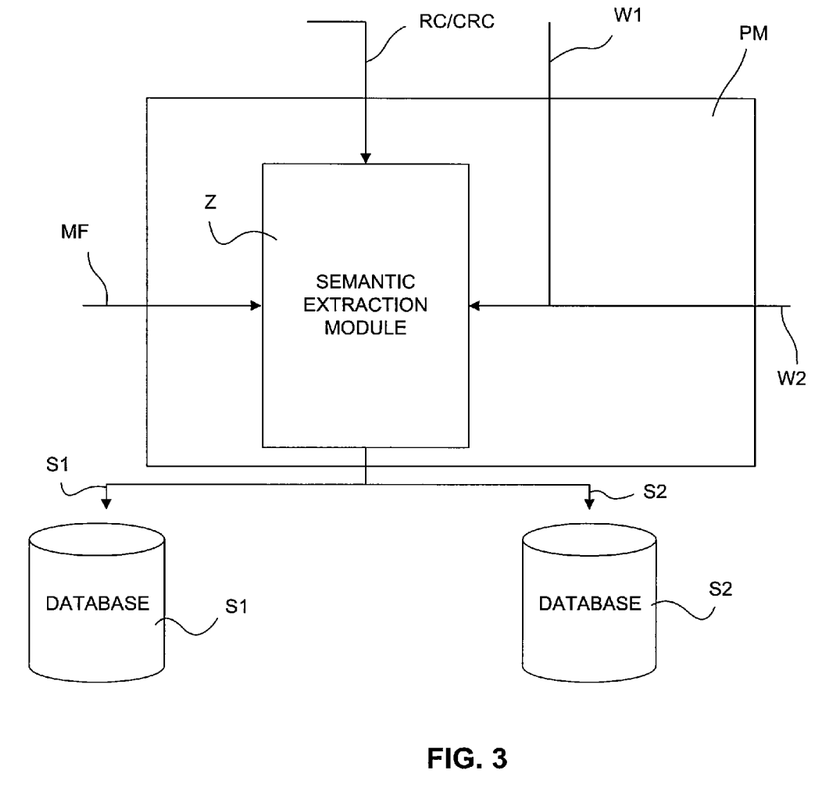
FIG. 3 is a block diagram detailing the structure of another of the bocks shown in FIG. 1.

FIG. 3 describes a possible implementation of a content processing system PM (showed also in FIG. 1) for loading category information $s_1$, $s_2$ into the databases $S_1$ and $S_2$ respectively.

More specifically, the content processing system PM comprises a semantic extraction module Z actuated in such a way to:

receive as inputs:
contents $w_1$ belonging to the contents already distributed by the distribution system D;
contents $w_2$ that are suitable to be potentially distributed;
the meta-families mf;
a training set of reference contents RC, labelled for each meta-family mf by using search engines or technical experts or the direct experience of final users and/or a central reference content CRC (so-called "centroid"), i.e., the meta data of a virtual content that can suitably represents the contents of a meta-family, obtained by the set of reference contents RC by using data-mining techniques such as Cluster Detection etc. In order to identify the contents $w_1$, $w_2$, the operator defines the URLs concerning the contents distributed via the CDN 1 (this is already a current practice in Content Delivery Networks of a known type) and those URLs concerning the contents to be potentially distributed;

classify each content $w_1$, $w_2$ in at least one meta-family mf on the basis of the semantic affinity of the content $w_1$, $w_2$ with the set of reference contents RC or the central reference content CRC. This semantic affinity is calculated as the distance, expressed by using data mining/artificial intelligence mechanisms (such as, for example, neural networks, fuzzy logic, decision trees), of the content $w_1$, $w_2$ from the set of reference contents RC or the central reference content CRC; and store the classification in meta-families of the contents already distributed w1 in the first database $S_1$ and store the classification in meta-families of those contents suitable to be potentially distributed $w_2$ in the second database $S_2$.

The structure of the databases $S_1$, $S_2$ involve collecting for each meta-family all the contents found by the semantic extraction module Z, possibly admitting superposition of meta-families and hierarchies.

Again with reference to FIGS. 1 and 2, output signals Out comprise content distribution events/actions based on triggered policies ("designated with the term "class templates" in the following) that are directly forwarded to the Content Provider while output signals r comprise class templates intended to drive the distribution system D in order to implement the necessary action for distributing the contents or for modifying the distribution policies. The action of distributing the contents is designated with p.

The block diagram of FIG. 2 details the structure and operation of the control system E. The control system E includes a class matcher module E1, a class/policy template repository E2, a command generator E3 and an API interface module E4.

Specifically, the class matcher module E1 is configured for matching together input information, selected between the information a, $c_1, \ldots, c_n$, d, h, $s_1$, respectively provided by the data sources A, $C_1, \ldots, C_n$, D, H, $S_1$, and feedback information, designated with $e_2$ in FIG. 2, provided by the class/policy template repository E2. Then, the class matcher module E1 generates a class template, designated CL, when an interest threshold is exceeded. The data sources from which the class matcher module E1 receives the input information and the interest threshold are defined by the operator in the policy template CPT as described in the following. Moreover, the class matcher module E1 uses the feedback information, provided by the class/policy template repository E2, in order to optimize the number of class templates generated and to forward the operator customizations about e.g. the thresholds.

In a preferred embodiment of the present invention, the key input information of the class matcher module E1 are represented by the usage information from the caches $C_1, \ldots, C_n$, and the policy template CPT defined by the operator. Then the class matcher module E1 matches together these information in a class template CL only if the interest threshold is reached. In a preferred embodiment of the present invention such an interest threshold can be representative of the frequency of the request for a given content belonging to a given meta-family extracted by the first database $S_1$. Subsequently, the class matcher module E1 can also filter and aggregate other input information (on the basis of the policies defined by the operator in the policy template CPT) in order to trigger the class template CL with all the required information.

The class template CL obtained is then forwarded to the class/policy template repository E2. Essentially, this is a database with a remote access configuration (designated with I) enabling the operator to input selected configuration policies ("actions") that are added to the class template CL generated by the class matcher module E1, as will be described in more detail in the following. For example the Service Provider may decide to distribute directly certain distribution events scheduled by the class template CL rather than directly informing the Content Provider by requesting to the Content Provider a confirmation (e.g. as a video display).

Furthermore, the operator can access the class/policy template repository E2 and, based on the meta-family extracted by the class matcher module E1, define what contents among those suitable to be potentially distributed ($w_2$) and belonging to the extracted meta-family, can be inserted in the class CL. In that way, the distribution of contents already provided to the users via the CDN 1 can be optimised, while meeting the interests voiced by the users by distributing contents having similar semantic characteristics.

The class template CL suitably modified by the operator ("modified class $CL_m$") is then sent to a command generator E3 to generate therefrom control signals r' suitable to be forwarded toward the distribution system D and the output signals out suitable to be forwarded toward the Content Provider involved.

Preferably, the control signals r' are processed via an API interface module E4 for producing the output signals r suitable to drive the distribution system D. Specifically, this API module E4 provides the programming interface for content distribution (for instance, by providing actions such as distribute, remove, enquiry, notify).

Figure 4:
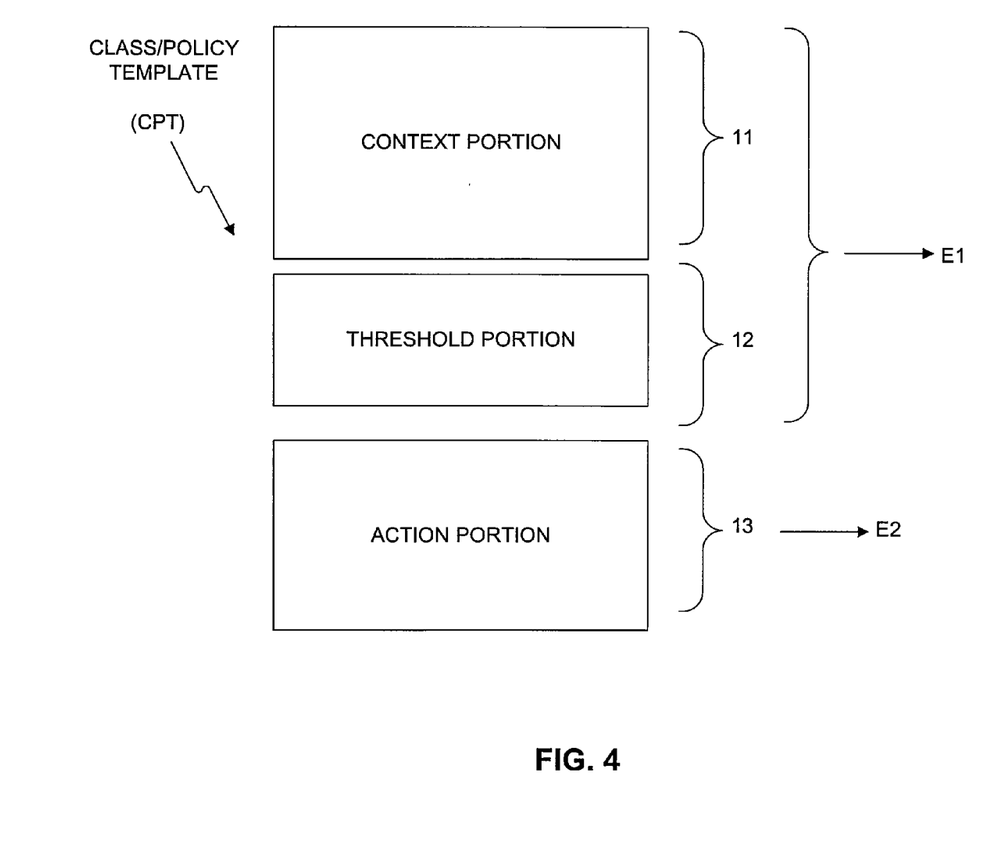
FIG. 4 is representative of the generic structure of a policy template as established by Service Provider/Content Provider in a system as described herein.

FIG. 4 details the structure of a policy template CPT defined by the operator.

The policy template CPT in question essentially includes three portions designated 11, 12 and 13. The first and the second portion 11, 12 are assigned to the class matcher module E1 while the third portion 13 is assigned to the class/policy template repository E2.

Specifically, in the first portion 11 ("context portion 11"), the operator defines the policy template context. In detail, this first portion 11 can include parameters that define which information are made available to the Content Provider by the Service Provider, more in particular, which information is to be collected from the data sources A, $C_1$, ..., $C_n$, D, H, S. Typically this information relates to content reference, hosted domain, semantics, user personal data, network topology, user location etc. Advantageously, the first portion 11 allows to optimise collection of information by the data sources while avoiding to repeat it for each context by using the feedback information $e_2$. Within the first portion 11, the Content Provider may also include some relevant clauses, as better detailed in the following with reference to FIGS. 5, 6 and 7.

In the second portion 12 ("threshold portion 12"), the operator sets the interest threshold through which the contents extracted from the context can be filtered, as will be described in more detail in the following.

The third portion 13 ("action portion 13"), assigned to the class/policy template repository E2, includes information related to the actions (such as distribute/remove/modify) associated with the class triggering. Such actions can be executed automatically or submitted to the operator to obtain a confirmation.

Subdividing the policy template CPT in three portions leads to tasks and configuration objects being defined between the Service Provider and the Content Provider in a flexible manner depending on the specific needs.

Figure 5:
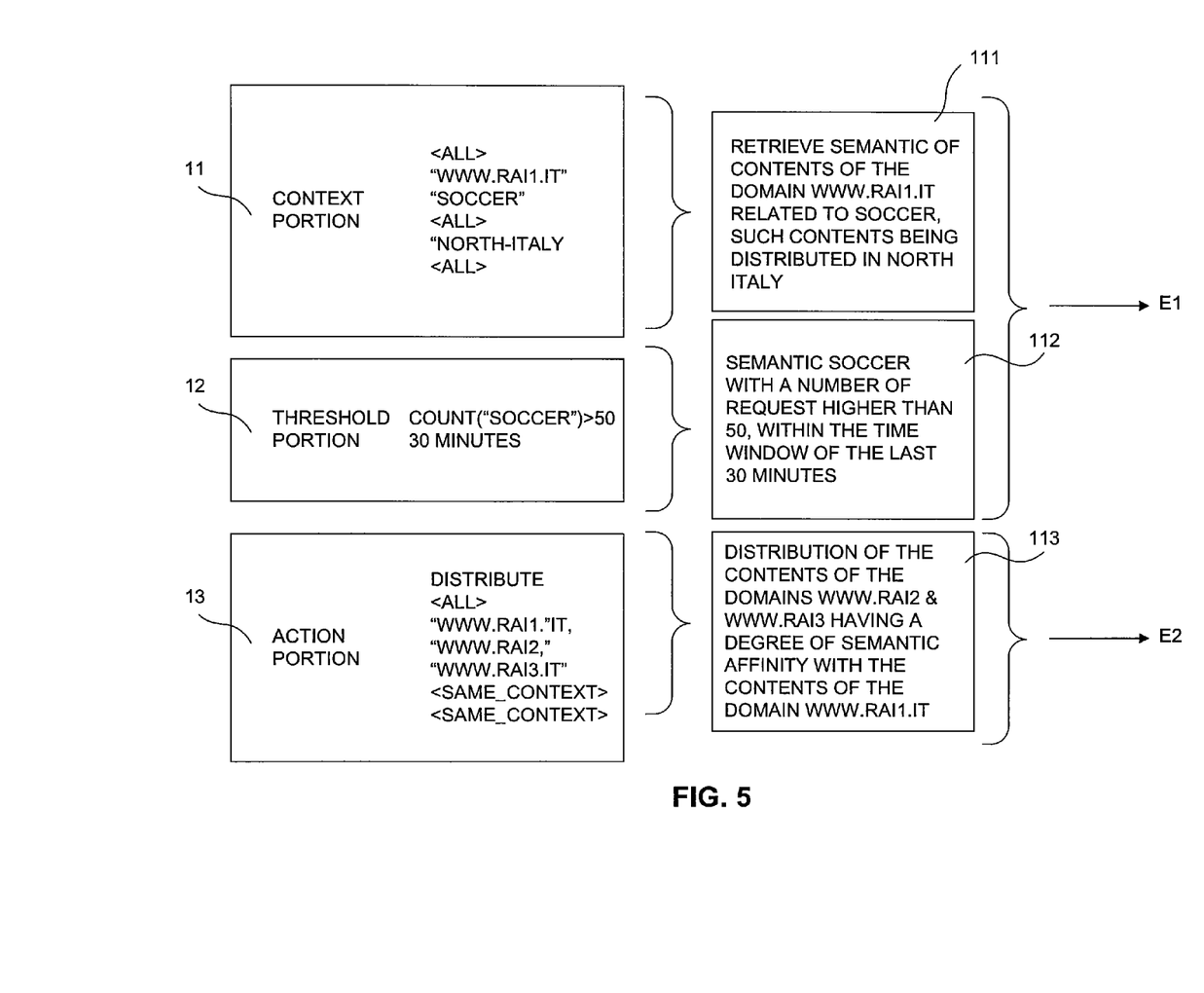
FIGS. 5, 6 and 7 are exemplary of class templates within the framework of the system described herein.

For example in FIG. 5 is shown an example of how distribution can be extended to other hosted domains based on a certain threshold condition being met by reference to contents that are semantically analogous and that were distributed previously.

In this case, it will be assumed that the context of interest for the involved Content Provider relates the contents of a domain (e.g. "www.rai.it") of a TV company related to the "soccer" semantic, such contents being distributed in the caches in a given geographical area, for instance, northern Italy, (see context portion 11).

The Content Provider can use a context clause to limit screening of the possible uses by the systems.

The interest threshold, as defined, is expressed in the threshold portion 12 and verifies if e.g. the semantic "soccer" in the context of concern had a number of requests higher than, say, 50 within the time window of the last thirty minutes.

Finally, the operation proposed for the context as defined in the context portion 11 is applied in the action portion 13 to the distribution system D ("distribute") while being extended to one or more additional hosted domain that include contents having a degree of semantic affinity with the contents of the domain selected in the context portion 11, e.g. "www.rai2.it" and "www.rai3.it".

The three respective blocks are designated 111, 112 and 113.

Figure 6:
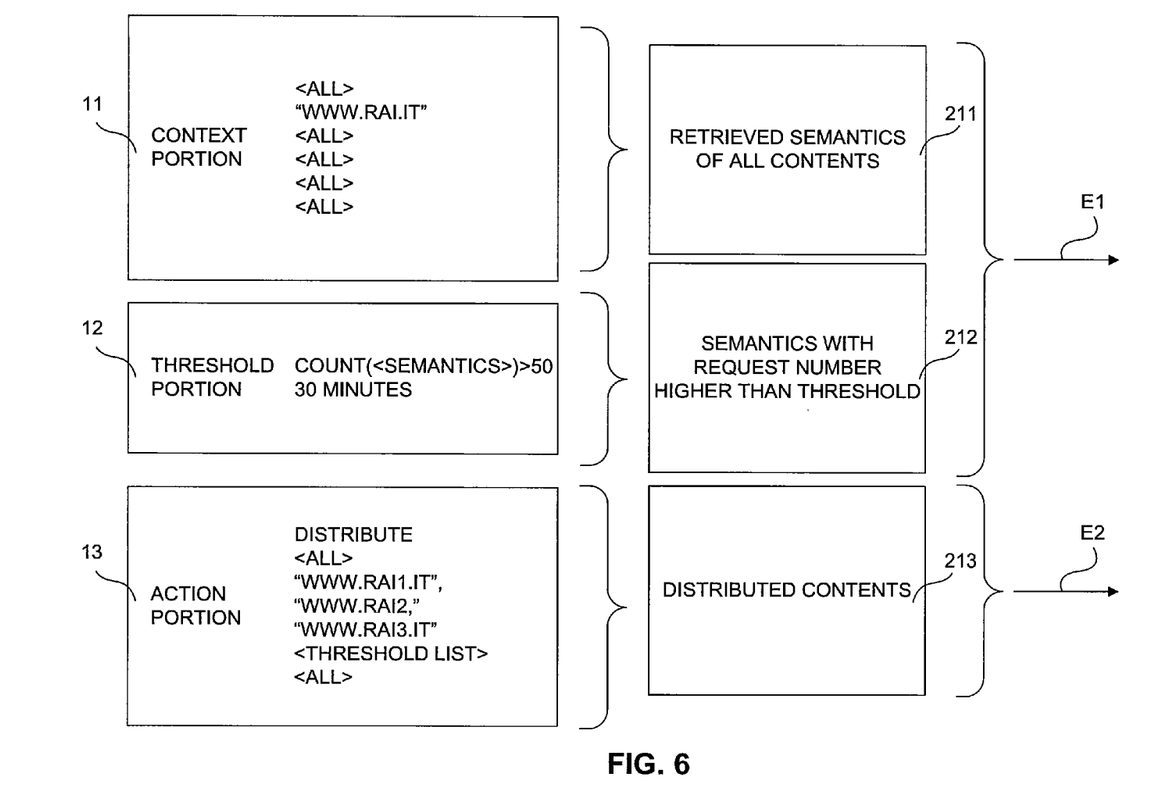

FIG. 6 shows another example of extension of distribution. This case, however, implements a more general, indirect mechanism by exploiting some macro-definitions at the policy template level.

Specifically, in the context portion 11, the operator specifies only the hosted domain, by leaving to the system the task of performing a complete screening in order to detect the semantics of all the contents distributed and requested for the hosted domain in question.

In the threshold portion 12, the interest threshold is specified in an indirect manner by referring to the element "semantics" as a list of semantics detected in the usages. This permits the parametrization also for the action portion 13 by providing dynamically the list of semantics for which distribution will have to be extended. At the moment of distribution, the system will take care of detailing the semantic references in the various content references related thereto.

Specifically, by referring to FIG. 6, a block 211 designates the action of retrieving the semantics for all the contents distributed within a given domain.

A block 212 denotes the action of detecting what semantics, among those found, are the object of a number of request higher than, say, fifty during the last thirty minutes.

Finally, block 213 refers to the possible distribution of contents with the same semantics of the domain thresholds to contents that are not distributed yet.

Figure 7:
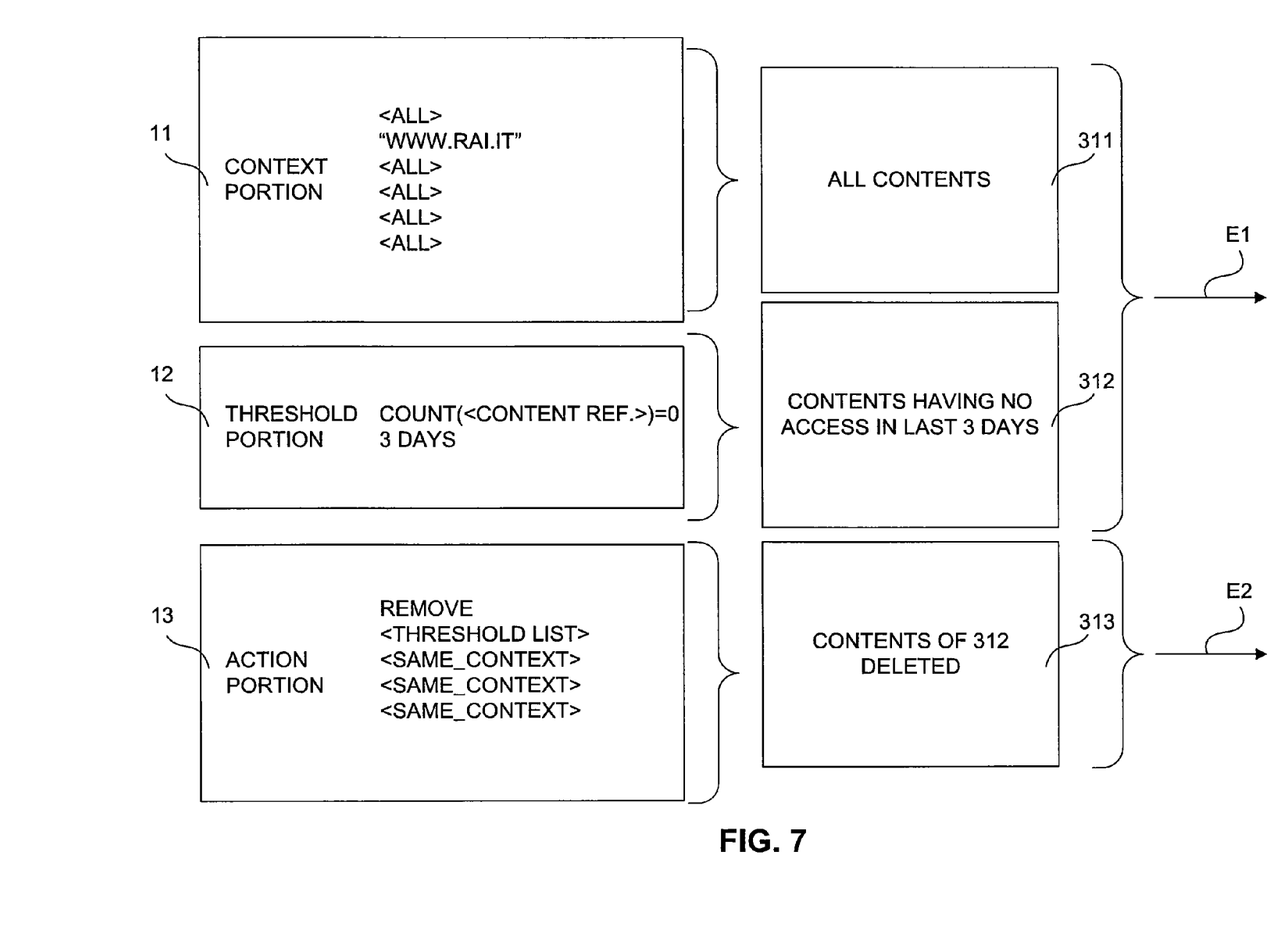

The example of FIG. 7 refers to a situation where direct reference to the contents is exploited in evaluating the threshold, in order to activate in an automatic way a "cleaning" algorithm directed at the caches in an aimed manner.

Specifically, a block 311 designates a step wherein all the contents distributed within a given domain are located, while a block 312 designates a step wherein those contents having no accesses during the last three days are detected.

Finally, the block 313 designates a step wherein the contents thus detected are removed.

Figure 8:
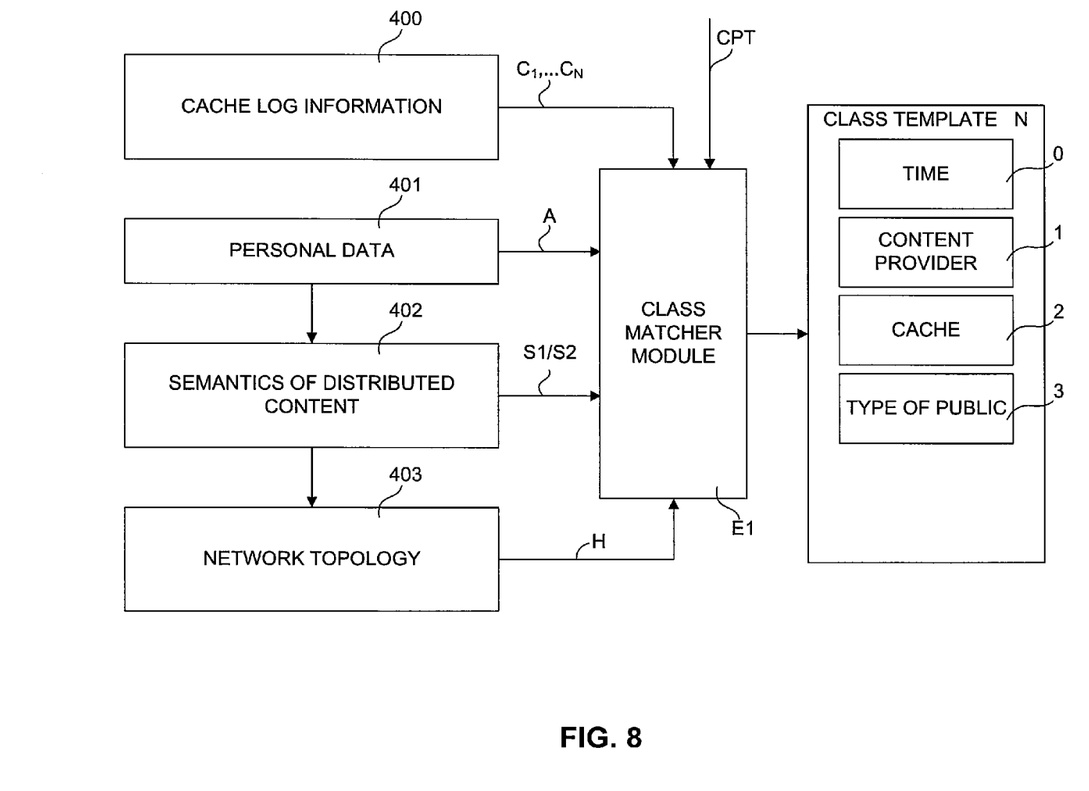
FIGS. 8 and 9 are two further block diagrams showing an exemplary system related to certain aspects of the present invention.
Figure 9:
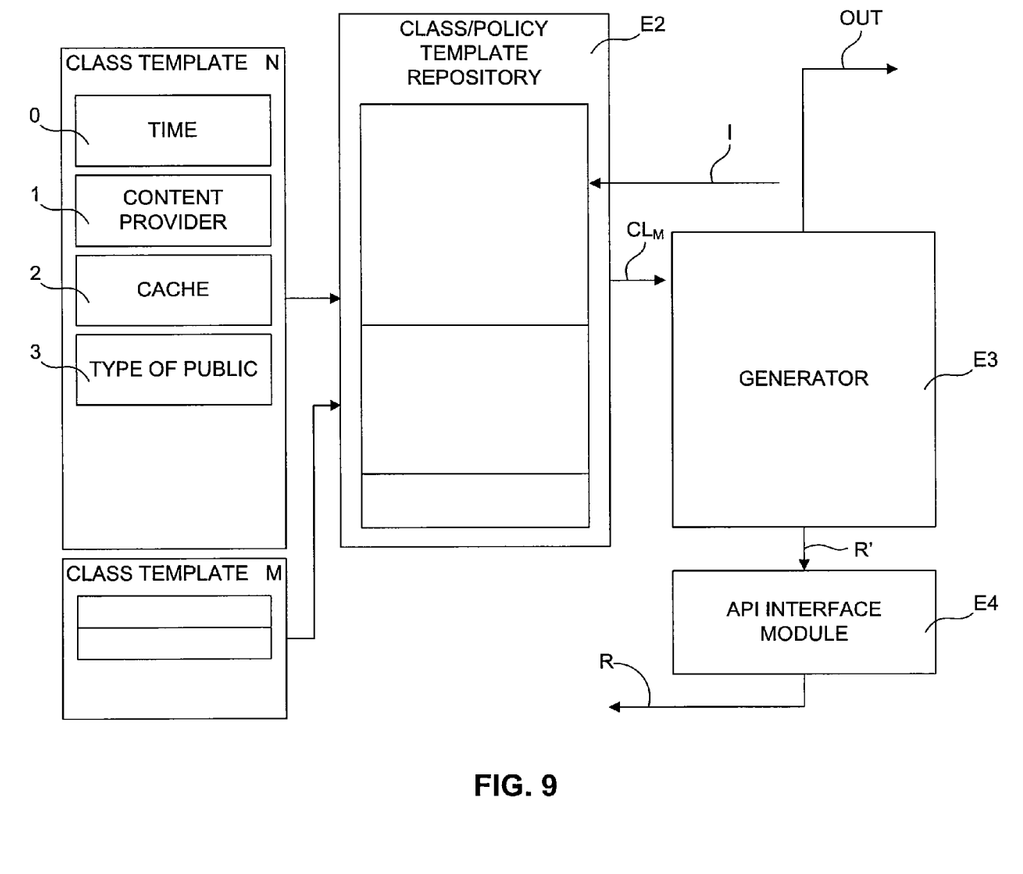

FIGS. 8 and 9 show an example of operation of the CDN 1, according to the present invention.

With reference to FIG. 8, the class matcher module E1 receives as inputs (defined by the operator in the context portion 11 of the policy template CPT):

cache log information derived from the cache servers $C_1, \ldots, C_n$ about, for example, user requests for a particular domain related to a soccer team during Sunday afternoon (block 400);

personal information derived from AAA servers about the users requesting this content. These personal information can show that the persons requesting this domain are on the average men 20 to 40 years of age with an ADSL access (block 401);

semantic information about the categorisations comprising the distributed contents (block 402).

network topology information (block 403) showing that the Content Provider "owning" this content is, for example, a given broadcasting corporation. This information is typically derived from the CDN Management system.

When an interest threshold, defined by the operator in the threshold portion 12 of the policy template CPT, is exceeded the class matcher E1 generates a class template n. The interest threshold can be representative, for example, of the frequency of user requests for a given content belonging to a given category (that is a given semantics). The generated class template n is marked e.g. as a "Very Frequently Requested" content class for the given Content Provider for a specific semantic. The relevant elements of the class template n are denoted with numbers from 0 to 3:

time: Sunday afternoon (0)
Content Provider: www.rai.it (1),
cache: Milan (2),
type of public: 20-40 old (3)).

FIG. 9 can be essentially regarded as a continuation of FIG. 8.

FIG. 9 shows how the class template n generated in the foregoing and another class template m, generated during a given time range, are sent to the class/policy template repository E2 in order to verify respective triggering events for the policies.

In the examples shown, the class m is a "frequently requested content" class for the same Content Provider e.g. www.rai.it.

Through the class/policy template repository E2, the operator is able to configure the distribution system D by managing in real-time the class templates n, m depending on defined polices (actions contain in the action portion 13).

Then, the command generator E3 receives from the class/policy template repository E2 the modified class templates n, m comprising the instructions (actions) related to managing such class templates.

At this point, the command generator E3 is able to deliver specific commands towards the distribution system D of the CDN 1.

The API interface E4 provides the necessary communication between the control system E and the distribution system D.

In the specific example shown, the control system E instantiates distribution commands for similar contents belonging to the same category used as an input.

By assuming that the Content Provider has a given content potentially available for distribution and belonging to the same category, the control system E may consider it for insertion in view of distribution and handle it with the same policies defined for the class template instantiated.

Furthermore, in defining policies it is possible to use also references to semantics or contents that are not directly used in the definition of the class template. This allows the operator i.a. to trigger distribution events starting from a content semantics while distributing another one. For instance, it is possible to define within a class the semantic "soccer match with the team A" and activate distribution by exploiting the same policies for the semantics "results for the first division in the soccer championship".

The arrangement described herein is particularly advantageous when a need exists of:

responding quickly to request from users, by trying to predict the behaviour of requests, and optimising exploitation of the storage resources of the CDN apparatuses, which is particularly important when the contents have considerable sizes.

In fact, this arrangement provides a viable response to these needs, by permitting contents to be distributed in an intelligent manner by taking into account usage data. This while also allowing the operator to consider, based on specific classifications, significant parameters such as any periodicity in the requests detected, the geographic and socio-anagraphic significance of the requests as well as the semantics of the contents available for distribution. The distribution policy derived from this classification permits to load/fill into specific devices in a CDN those contents held to represent the most significant contents based on such parameters, while also possibly dispensing with those contents held to attract a lower degree of interest.

Furthermore, the arrangement described herein is suitable to maintain complete real-time documentation concerning the requests expressed for all the contents distributed over a whole CDN 1. This documentation provides the management of the network with significant amount of a real-time information concerning each and every content distributed so as to produce suitable control signals for the distribution system D. Consequently, the CDN 1 may be operated by implementing distribution policies of the contents defined as a real-time policies.

Of course, without prejudice to the underlying principle of the invention, the details and embodiments may vary, also significantly, with respect to what has been described and shown, by way of example only, without departing from the scope of the invention, as defined in the claims that follow.

The invention claimed is:

1. A method implemented by a control system for controlling distribution of media contents over a network of an operator, wherein said contents comprise distributed contents to surrogate servers and remaining contents that have not been distributed to the surrogate servers, comprising the steps of:

identifying, by the operator, additional contents that are not distributed over the network yet;

dynamically retrieving a set of semantics from the distributed contents as a set of categories;

automatically identifying, for each category, at least a reference content by analyzing meta data of the media contents, wherein said identifying comprises identifying a set of reference contents by using search engines and calculating a central reference content of said set of reference contents;

associating, by the control system, said identified contents with said predefined categories based on semantics affinity with said reference content, said semantics affinity being calculated as the distance of each of said identified contents to said reference content, wherein said calculating comprises using data mining or artificial intelligence mechanisms;

determining, by the control system, an interest value for each category based on statistical data indicative of user interest in the distributed contents associated with the respective category;

receiving an input of a first interest threshold and a second interest threshold greater than the first interest threshold;

identifying, by the control system, at least one first category and at least one second category, from said set of categories, when the distributed contents associated with the first category have an interest value below the first interest threshold and the distributed contents associated with the second category have an interest value that exceeds the second interest threshold;

removing the distributed contents associated with the first category from the surrogate servers; and making at least one of the identified contents associated with said second category available for distribution at the surrogate servers.

2. The method according to claim 1, wherein said mechanisms comprise at least a mechanism selected from neural networks, fuzzy logic and decision trees.

3. The method according to claim 1, comprising the steps of:

storing the classification of said distributed contents in a first database; and storing the classification of said identified contents in a second database.

4. The method according to claim 3, wherein said step of identifying at least one second category comprises the steps of:

defining the second interest threshold to be representative at least of a frequency of user requests for a given distributed content; and extracting from said first database category information comprising at least one identified second category associated with said distributed content when said second interest threshold is exceeded.

5. The method according to claim 3, wherein said step of making at least one of the identified contents associated with said second category available for distribution at said surrogate servers comprises the step of:

extracting from said second database contents information related to said at least one identified content.

6. The method according to claim 3 comprising the steps of:

identifying additional information comprising at least usage information provided by said surrogate servers;

matching said additional information with said category information provided by said first database;

generating at least one class template comprising said matched information;

adding to said class template said contents information provided by said second database; and forwarding said at least one modified class template to a distribution system.

7. The method according to claim 6 wherein said step of adding to said class template said contents information provided by said second database comprises the steps of:

accessing a class template repository; and modifying said class template according to said content information 8. A non-transitory computer readable medium encoded with a computer program product loadable into a memory of at least one computer, the computer program product comprising software code portions for performing the method of claim 1.

* * * * *